(12) United States Patent
Carpenter et al.

(10) Patent No.: US 9,165,267 B2
(45) Date of Patent: *Oct. 20, 2015

(54) SCHEDULING AND DECISION SYSTEM

(75) Inventors: Tom Carpenter, Aliso Veijo, CA (US); Clayton Monkus, Mount Holly, NC (US)

(73) Assignee: nMetric, LLC, Costa Mesa, CA (US)

( * ) Notice: Subject to any disclaimer, the term of this patent is extended or adjusted under 35 U.S.C. 154(b) by 1403 days.

This patent is subject to a terminal disclaimer.

(21) Appl. No.: 12/236,328

(22) Filed: Sep. 23, 2008

(65) Prior Publication Data

US 2009/0083577 A1    Mar. 26, 2009

Related U.S. Application Data

(63) Continuation-in-part of application No. 10/470,354, filed as application No. PCT/US03/00635 on Jan. 7, 2003, now Pat. No. 7,454,389.

(60) Provisional application No. 60/432,498, filed on Dec. 10, 2012.

(51) Int. Cl.
*G06Q 10/00* (2012.01)
*G06Q 10/06* (2012.01)
*G06Q 99/00* (2006.01)

(52) U.S. Cl.
CPC ............ *G06Q 10/06* (2013.01); *G06Q 99/00* (2013.01)

(58) Field of Classification Search
CPC ...................................... G06Q 99/00
USPC ...................................... 705/7.41
See application file for complete search history.

(56) References Cited

U.S. PATENT DOCUMENTS

| | | | |
|---|---|---|---|
| 6,006,016 A * | 12/1999 | Faigon et al. | 714/48 |
| 6,404,880 B1 * | 6/2002 | Stevens | 379/221.11 |
| 6,526,044 B1 * | 2/2003 | Cookmeyer et al. | 370/352 |
| 6,577,988 B1 * | 6/2003 | Travagline et al. | 702/188 |
| 6,633,782 B1 * | 10/2003 | Schleiss et al. | 700/26 |
| 7,159,237 B2 * | 1/2007 | Schneier et al. | 726/3 |
| 7,274,971 B2 * | 9/2007 | Brill et al. | 700/230 |
| 7,328,260 B1 * | 2/2008 | Muthiyan et al. | 709/224 |
| 7,607,169 B1 * | 10/2009 | Njemanze et al. | 726/22 |
| 2002/0065885 A1 | 5/2002 | Buonanno et al. | |
| 2002/0174050 A1 | 11/2002 | Eynard et al. | |
| 2002/0194053 A1 | 12/2002 | Barrett et al. | |
| 2006/0092019 A1 * | 5/2006 | Fallon | 340/541 |
| 2007/0255805 A1 * | 11/2007 | Beams et al. | 709/218 |

* cited by examiner

*Primary Examiner* — Thomas Mansfield
(74) *Attorney, Agent, or Firm* — Fish & Tsang LLP

(57) ABSTRACT

The inventive subject matter herein is directed toward an improved scheduling and planning system in which a workflow scheduling system automatically detects a problematic workflow event. The system then selects a primary human contact and a secondary human contact from a hierarchical selection list and automatically attempts to notify the primary human contact by escalating through the primary human contact's contact methods. When the primary human contact fails to respond within a threshold of time, the system automatically attempts to notify the secondary human contact by escalating through the secondary human contact's contact methods.

20 Claims, 2 Drawing Sheets

| Parameter | Value |
|---|---|
| Milling machine capacity | 10 units/min. |
| Joining machine capacity | 8 units/min. |
| Man hours required to complete workorder 0856201 | 12 hours |
| Assembly | 7 hours |
| Milling machine | 10 units/min |
| Finishing | 4 hours |
| Inspection | 1 hour |

SCHEDULING AND DECISION SYSTEM

This application is a continuation application of U.S. patent application having Ser. No. 10/470,354 filed on Jul. 22, 2003, which claims priority to international application PCT/US03/00635 filed on Jan. 7, 2003, and claims priority to U.S. provisional application having Ser. No. 60/432,498 filed on Dec. 10, 2002. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is scheduling and decision making systems.

BACKGROUND OF THE INVENTION

In manufacturing and other applications, scheduling and decision making systems use computers to mange the increasing quantity of data. Traditionally, the cost of data storage was relatively expensive, but today the cost of storing data is so low that in most instances the quantity of data is not cost prohibitive. What can be cost prohibitive, however, is the time and effort required to filer the data and to get relevant information to the appropriate user in a timely manner.

In batch systems, filtering of data can be accomplished either automatically or manually. Automatic filtering may take the form of an instruction hard coded in a program, an input parameter to a program (e.g. a selection criteria), or a routing instruction that instructs the system to route particular output to a particular user. Manual filtering of data is generally performed by a person and can be as simple as discerning the appropriate user to receive a computer generated report and giving the report to that user. Systems which utilize manual filtering may also utilize bins or mail boxes that store hard copy reports for an associated user. A persisting problem, however, with batch systems, is that massive reports are often created and much of the information in the report is either superfluous, out-dated, or intended for more than one user.

Online reporting and display of data alleviated some of the problems associated with massive hard copy reports and timeliness of data by allowing users to view real time or near real time data using a display screen. Additionally, online systems empowered users with the ability to make decisions that more accurately reflected current conditions. Still, there were problems getting the right information to the right person at the right time. At times, the right person was not available or access to the right information was limited. Even still, there were instances in which too much information was available and this added to the time needed to make a timely decision. There remains a need for improved scheduling and decision making systems and methods which facilitate getting the right information to the right people at the right time.

SUMMARY OF THE INVENTION

The inventive subject matter herein is directed toward improved scheduling and planning system in which computer implemented software uses a hierarchical selection list to select at least one of a plurality of unconnected users and contact the selected user(s) as a function of an event. Unconnected means that the user is not physically situated such that online access to the scheduling system is readily available. For example, an unconnected user may be a user of the scheduling system who is physically located outside the local network, a supplier of a product used by the scheduling system, or a customer of the entity controlling the scheduling system.

With regard to hierarchy, a selection list advantageously correlates a plurality of users with a severity of a problem. It is contemplated that an event may cause a scheduling or decision making problem. Such an event may include the failure of a machine, the absence of an employee, the shortage of a raw material, and so on. Correlation of a user with a severity of a problem may include selecting a user that is most appropriate to solve a particular problem. For instance if the problem is a shortage of a raw material that will cause a delay in production of a product for an important customer, it may be appropriate to select a purchasing manager who can leverage his position with vendors to get expedited delivery of a product.

A selection list may alternatively and/or additionally correlate users with contacting methods. By adding a further layer of correlation, it may be easier to contact the appropriate person to solve a particular problem or address a particular event. Thus, hierarchical selection may include multiple layers (tiers) of correlation in which users are correlated with type of problem, severity of problem, and contacting method.

Another aspect of the inventive subject matter includes an improved decision and/or scheduling system that has soft fields for describing resources. A soft field is a field that is created dynamically by a user. Thus, not only do users input values for fields, but they actually create fields. In some embodiments, soft fields will be sortable and/or searchable enabling users to further define the type and extent of the data they wish to receive. It should be noted that soft fields may be used for locations, processes, materials, or most any resource.

Hierarchical soft field configuration can be useful in almost any planning and/or scheduling system, especially those that assume limited requirements such as ERP (enterprise resource planning), MRPII (manufacturing resource planning), and so on.

DETAILED DESCRIPTION

Figure 1:
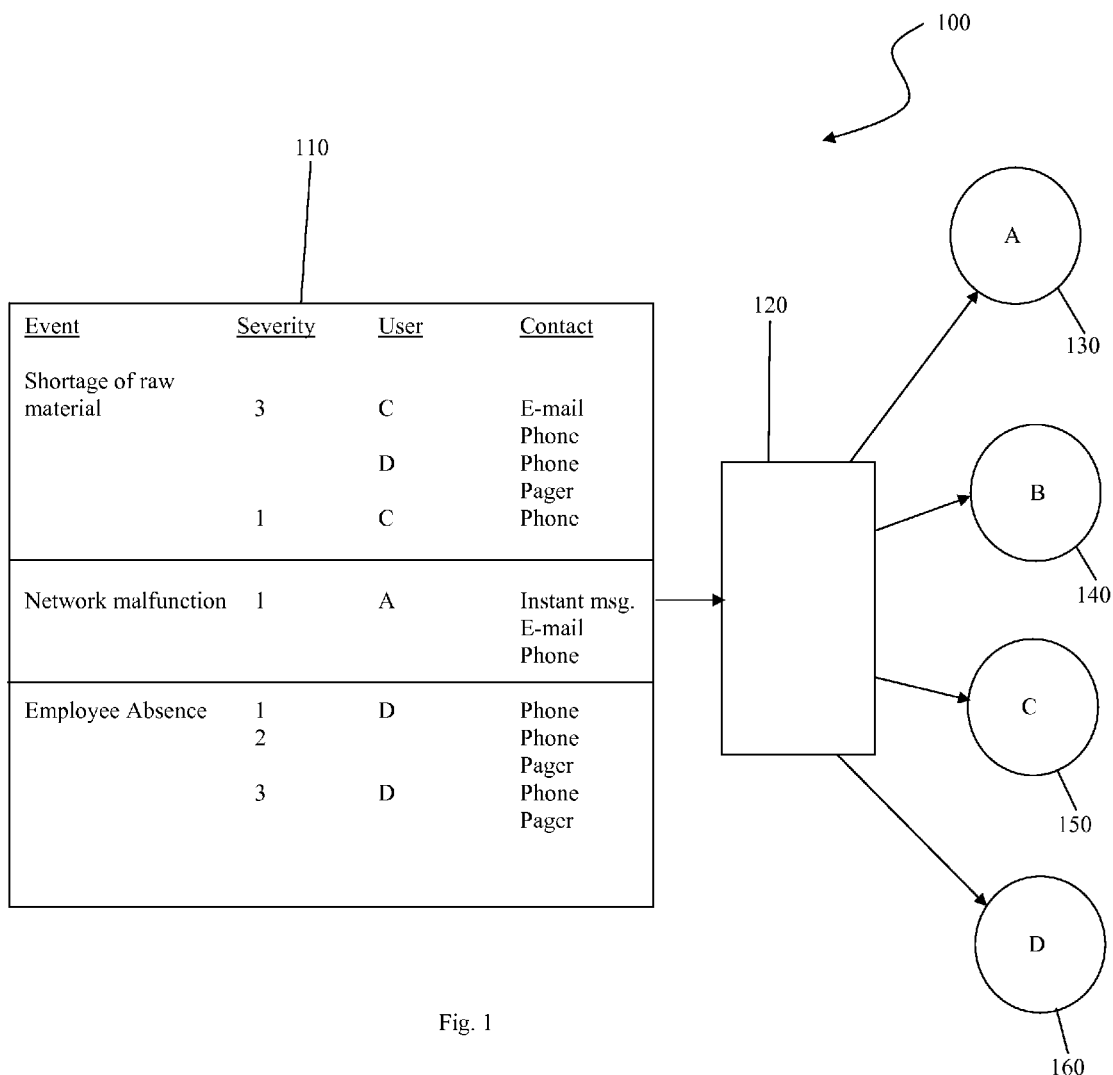
FIG. 1 is a schematic of an event driven scheduling system having a hierarchical selection list.

In FIG. 1, an event driven scheduling system 100 generally comprises a hierarchical selection list 110, computer implemented software 120, and a plurality of unconnected users 130-160.

A scheduling system is a manipulation of data which results in a planned task. The manipulation of data typically includes input, utilization, and display of data, and the planned task typically includes a description and time of performance for the task.

A preferred hierarchical selection list can take the form of a hardcopy list or a virtual list, but either way, a hierarchical aspect of the list includes levels of data items that have some sort of relationship (e.g. chain or pointer) to one another. The hierarchical selection list 110 of FIG. 1, for instance, has a relationship between an event, a severity of a problem or event, an unconnected user, and a contact method. In a preferred class of embodiments, hierarchy includes a step down approach that begins with an event which correlates to a severity of a problem which further correlates to an unconnected user and finally to a plurality of contacting methods for contacting the unconnected user.

A hierarchical selection list 110 has fields for event, severity, user, and contact. It should be appreciated that additional, fewer, or other fields may be part of a hierarchical selection list. For example, it may be useful for a hierarchical selection list to have a field to indicate whether an affected customer is a preferred or important customer. Another example of a field that can be added to a hierarchical selection list is e-mail address, phone number, pager number, etc. . . . While such fields may be maintained in a file other than one of those associated with the hierarchical selection list, it may be advantageous to have those fields in a file associated with a hierarchical selection list.

A computer implemented software 120 is a set of computer interpretable instructions. The computer implemented software 120 uses the hierarchical selection list 110 to select at least one of a plurality of users and contact the selected user(s) as a function of an event. It is contemplated that a computer includes a desk top device, a notebook, a PDA, a cell phone, and so on.

Unconnected users 130-160 are those users of the scheduling system that are not physically situated such that access to the scheduling data is readily available. For example, an unconnected user may be a user of the scheduling system who is physically located outside the local network, a supplier of a product used by the scheduling system, or a customer of the entity controlling the scheduling system.

Consider the following example with reference to FIG. 1. A foreman on the shop floor of a manufacturing company is notified that an unexpected shortage of a raw material has occurred (an event, also sometimes referred to as a problem). The event is either manually entered into the scheduling system 100 or is automatically sensed or detected by the system or a related module, but in any case the system 100 has been notified of the event. A severity of the problem is either manually input or automatically determined by the system or some related module. It should be pointed out that sensing of an event and its associated severity can be accomplished using a sensing device (e.g. optical or electro-mechanical). Sensors can also be used to inspect products to determine whether quality standards have been met.

Continuing this example, within a very short time (2, 10, 30 seconds) of notification of the event, the computer generated software 120 selects a user or set of users and correlates the user or users with the severity. In this case, say the severity is 3 (a high severity). Thus, user C 150 is selected as a function of the event and severity.

Contemplated methods of contact can include pager, cell phone, e-mail, instant message, broadcast to a mobile telematics device, and messenger. In this example, the optimal method of contacting user C 150 for this severity and this event is by e-mail. Preferably, the system 100 generates an e-mail to user C 150 advising her of the problem. It is contemplated that an e-mail or other message can contain information such as the event, the severity of the problem, the customer involved, a work-order number, the due date of the scheduled task, the time of the problem, the users contacted, threshold time to respond, and soft fields information (discussed infra). Additionally, it may be advantageous to utilize a backup contact method (e.g. phone) if the primary (e.g. e-mail) method of contact is not responded to within a maximum threshold of time. A backup or secondary user can also be contacted. In other embodiments, more than one user can be contacted simultaneously and/or more than one method of contacting can be used simultaneously. Thus, user D can be an additional primary user or a secondary user depending on parameters that are input to the system.

Figure 2:
FIG. 2 is a schematic of a hierarchical soft field list.

Referring now to FIG. 2, an improved decision and/or scheduling system generally comprises a data model 200 having soft fields for describing resources. These soft fields are also referred to herein as parameter/values with the parameter equating to the type of resource and the value equating to the data contained in the field. Thus, an exemplary parameter/value pair is "maximum temperature/32° F.".

A soft field is generally created by a user through use of a dynamic schema utility. It should be noted that a soft field involves more than mere initialization of a pre-existing field on a database schema, it involves the creation of such a field. Soft fields are used to give users flexibility in determining the fields they use to describe resources. Moreover, use of soft fields reduces the number of fields that are not used (i.e. contain blanks). In some embodiments, soft fields will be sortable and/or searchable enabling users to further define the type and extent of the data they wish to receive. It should be noted that soft fields may be used for most any resource including location, process, material, man hours, and so on.

Hierarchical soft field configuration can be useful in almost any planning and/or scheduling system, especially those that assume limited requirements such as ERP (enterprise resource planning) and MRPII systems. Hierarchical soft fields can be used to store information that is included in a message sent to a user as a function of an event.

Display of parameters is typically accomplished using scroll down menus. By reviewing the items displayed in the scroll down menu, one can determine whether a particular parameter has already been established. It should be noted that multiple entries can exist having the same parameter, as long as the associated value is different. For example, parameter/value "milling machine capacity/10 units/min" can co-exist with a parameter/value entry of "milling machine capacity/4 units/min". It is contemplated that a user of the system will determine which of the parameter/value pairs is appropriate for a given entry.

Thus, specific embodiments and applications of scheduling and decision systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An improved workflow scheduling system, wherein the improvement comprises:

an optical or electro-mechanical sensing device configured to automatically detect information about a problematic workflow event, wherein the sensing device is configured to inspect a product to determine whether quality standards have been met; and a computer-operated contacting device configured to:

(a) select a primary human contact, a backup human contact, a first series of contact methods for the primary human contact, and a second series of contact methods for the backup human contact, all from a hierarchical contact list as a function of a potential severity correlated with the information about the problematic workflow event, (b) automatically make an attempt to notify the primary human contact, escalating through the first series of contact methods for the primary human contact, and (c) automatically escalating through the second series of contact methods for the backup human contact when the primary human contact fails to respond within a maximum threshold of time.

2. The system of claim 1, wherein a first contacting method of the first series of contacting methods is used by the contacting device to notify a first unconnected human user and a second contacting method of the second series of contacting methods is used by the contacting device to notify a second unconnected human user.

3. The system of claim 1, wherein a first contacting method of the first series of contacting methods is used by the contacting device to notify a supplier.

4. The system of claim 1, wherein a first contacting method of the first series of contacting methods is used by the contacting device to notify a support person.

5. The system of claim 1, further comprising a decision system having a computer memory that stores a database representing a data model that includes first and second soft fields describing resources.

6. The system of claim 5 wherein the first and second soft fields are associated in a hierarchical manner.

7. The system of claim 5 wherein the first and second soft fields are sortable and searchable.

8. The system of claim 5 wherein the decision system further comprises a third soft field for a location.

9. The system of claim 5 wherein the decision system further comprises a fourth soft field for a process.

10. The system of claim 5 wherein at least some of the resources are materials.

11. The system of claim 5 wherein the decision system further comprises a computer implementation of an ERP (enterprise resource planning) planning algorithm.

12. The system of claim 5 wherein the decision system further comprises a computer implementation of a MRPII (manufacturing resource planning) planning algorithm.

13. A method of resolving a delay in production of a product, comprising:

automatically detecting, via an optical or electro-mechanical sensing device, information about a problematic workflow event by inspecting a product to determine whether quality standards have been met;

selecting a primary human contact, a backup human contact, a first series of contact methods for the first human contact, and a second series of contact methods for the second human contact, all from a hierarchical contact list as a function of a potential severity correlated with the information about the problematic workflow event;

make an attempt, via a computer-operated contacting device, to notify the selected primary human contact, escalating through the first series of contact methods for the selected primary human contact in the hierarchical contact list; and automatically making an attempt, via the computer-operated contacting device, to notify the second human contact, escalating through the second series of contact methods for the backup human contact in the hierarchical contact list when the primary human contact fails to respond within a maximum threshold of time.

14. The method of claim 13, wherein a first contacting method of the first series of contacting methods directs the message to an unconnected user through a physical communicator.

15. The method of claim 13, wherein the step of making successive attempts to notify human contacts completes the task of selecting the human contacts from the hierarchical list within 10 seconds after completing the step of detecting information about a problematic workflow event.

16. The method of claim 13, wherein the step of creating a hierarchical selection list comprises configuring a plurality of soft fields.

17. The method of claim 1, wherein the software uses the list to instruct the contacting device to employ a first contacting method of the first series of contacting methods when the severity correlates with a first potential severity and to instruct the contacting device to employ a second contacting method of the second series of contacting methods when the severity correlates with a second potential severity.

18. The method of claim 1, wherein the workflow event is at least one of a personnel-driven issue, a machine related issue, and a lack of sufficient materials issue.

19. The method of claim 13, wherein the sensing device is configured to detect an absence of an employee.

20. The method of claim 13, wherein the sensing device is configured to detect a shortage of raw material.

\* \* \* \* \*